United States Patent  [19]

Sigmund

[11] 3,974,883
[45] Aug. 17, 1976

[54] TIGHTENING SYSTEM

[75] Inventor: Jerry A. Sigmund, Willow Grove, Pa.

[73] Assignee: Standard Pressed Steel Co., Jenkintown, Pa.

[22] Filed: May 19, 1975

[21] Appl. No.: 579,112

[52] U.S. Cl. .................................................. 173/12
[51] Int. Cl.² ........................................ B23Q 5/08
[58] Field of Search ............... 173/12; 73/133, 136, 73/139

[56] References Cited
UNITED STATES PATENTS

| | | | |
|---|---|---|---|
| 2,756,622 | 7/1956 | La Belle | 73/139 X |
| 3,643,501 | 2/1972 | Pauley | 73/133 |
| 3,693,726 | 9/1972 | Hörnig | 173/12 |
| 3,703,933 | 11/1972 | Schoep | 173/12 |
| 3,710,874 | 1/1973 | Seccombe et al. | 73/139 |

Primary Examiner—Ernest R. Purser
Assistant Examiner—William F. Pate, III
Attorney, Agent, or Firm—Andrew L. Ney; Aaron Nerenberg; Robert P. Seitter

[57] ABSTRACT

The invention disclosed herein relates to a tightening system including a wrench for applying torque and imparting rotation to a fastener system. Associated with the wrench is a control system including measuring systems for developing a first signal representative of the torque applied to the fastener being tightened and a second signal representative of the rotation of the fastener, both of which are fed to a gradient calculating system for developing a signal representative of the slope of a Torque-Rotation curve which can be plotted for the particular fastener being tightened. The gradient signal is used to develop a signal representative of a theoretical curve which is processed with one of the previously developed signals to develop a control signal when the fastener has been tightened to its yield point or some similarly significant point.

In one embodiment of the invention, the theoretical curve signal is representative of a curve which ultimately becomes parallel to the linear portion of the Torque-Rotation curve and whose linearity is maintained when the Torque-Rotation curve deviates. The difference between the theoretical torque signal and the instantaneous torque signal, which is referred to as a decision-making signal, is determined and the difference between successive decision-making signals over a fixed increment of rotation is compared to the maximum gradient of the Torque-Rotation curve in its linear region. When the compared signals have a predetermined relationship, the control signal is developed.

In another embodiment of the invention, the theoretical curve signal is representative of a curve superimposed on the Torque-Rotation curve through its linear region and whose linearity is maintained when the Torque-Rotation curve deviates. A ratio of the instantaneous torque signal to the theoretical torque signal is determined, and when this ratio is approximately equal to a predetermined ratio, the control signal is developed.

In yet another embodiment of the invention, the theoretical curve signal is representative of a curve offset from the Torque-Rotation curve through its linear region by a predetermined constant and whose linearity is also maintained when the Torque-Rotation curve deviates. The theoretical torque signal is compared to the instantaneous torque signal and when the compared signals are approximately equal, the control signal is developed.

51 Claims, 7 Drawing Figures

TIGHTENING SYSTEM

This invention relates generally to apparatus for tightening fasteners and, more particularly, to apparatus for tightening fasteners to the yield point of the fastener material, or some similarly significant point characterized by a significant change in slope of the Torque-Rotation curve plotted for that particular fastener being tightened and corresponding to a predetermined axial load on the fastener.

In the design of structural joints secured by mechanical fastener systems, it is usual to provide for the fasteners to exert a predetermined clamping force or load on the structural members to insure the integrity of the joint. When the joints are assembled, therefore, it is desirable that the fasteners be tightened to exert a predetermined axial load on the associated structural members. However, prior art tightening techniques for tightening threaded fasteners such as nuts and bolts to exert a predetermined load on associated structural members are not entirely satisfactory. For example, the most accurate tightening technique involves a measurement of the axial strain or stretch of the bolt while it is being tightened and relating the stretch to the stress or axial load acting on the bolt through previously calculated stress-strain relationships. While most accurate, practical applications do not usually permit measurement of the stretch of the bolt and, in those instances where the stretch can be measured, it is a time consuming and relatively expensive technique. Accordingly, this technique is used in relatively few applications outside of laboratory testing.

Another known tightening technique that is commonly used in most joint assembly operations involves the use of torque controlled tools, that is, tools that indicate when the torque applied to the fastener equals or exceeds a predetermined torque and stop tightening the fastneer in response thereto. Torque measurement is relatively easy and since torque is related to the axial force induced in the fastener, and exerted on the structural members, the predetemined torque can be selected to theoretically correspond to the predetermined clamp load specified for the joint. However, when tightening threaded fasteners in assembly line operations, wide variations in the actural torque-load relationships are experienced. These variations are caused by a variety of factors including allowable tolerance variations in the dimensions and strength of the fastners and structural members and lubrication or absence thereof on the mating surfaces of the fasteners and/or the structural members, all of which, in turn, cause large variations in the coefficient of friction between the mating surfaces of the joint. In actual practice, variations of up to ± 30% in the axial load on the bolts used for a particular application can be experienced at the same torque level. Accordingly, the torque control technique is not very accurate.

In an effort to overcome the problems associated with the prior art tightening techniques, several techniques have been attempted that include the use of tools measuring both the torque and angular displacement or rotation of a fastener during the tightening cycle and which include control systems operative in response to these measurements to determine when the slope of a torque-rotation curve for the fastener indicates that the yield point of the fastener has been reached and to then stop tightening the fastener. Examples of techniques and tools of this type are disclosed in the U.S. Pat. No. 3,643,501, issued Feb. 22, 1972 to Pauley and U.S. Pat. No. 3,693,726, issued Sept. 26, 1972 to Hornig et al. Neither the techniques nor the tools disclosed in the Pauley and the Hornig et al patents are generally satisfactory for accomplishing the desired objective. In each of the disclosed techniques it is necessary to know the torque-rotation relationship for the particular fastener being tightened prior to its tightening. The torque-rotation relationship varies over a wide range for the same reasons that the torque-load relationships vary and, accordingly, the techniques and tools disclosed in the noted patents can be utilized only where the characteristics of the joint assembly are known in advance and average relationships must be predetermined and utilized in operation of the tools. Accordingly, the versatility and accuracy of the techniques and tools disclosed in the noted patents are not particularly satisfactory.

It is an object of this invention, therefore, to provide a tightening system for accurately tightening a fastener system to its yield point or similarly significant point indicative of a significant change in slope on a curve plotted for various tightening characteristics and corresponding to a predetermined axial load.

It is yet another object of this invention to provide a tightening system for accurately tightening a fastener system to its yield point or similarly significant point indicative of a significant change in slope on the Torque-Rotation curve and corresponding to a predetermined axial load.

It is still another object of this invention to provide a tightening system for accurately tightening a fastener system to a predetermined axial load with minimum previous knowledge of the particular joint being assembled.

Finally, it is an object of this invention to provide a tightening system that is versatile, reliable, economical and accurate.

These and other objects of this invention are accomplished by providing a tightening system including a wrench for applying torque and imparting rotation to a fastener member associated with the joint to be assembled. Associated with the wrench are measuring means for developing a signal representative of the torque being applied to the fastner member and for developing a signal representative of the rotation of the fastener member, which signals are fed to gradient calculating member for developing a signal representative of the slope of a curve plotted for the torque and rotation of the particular fastener being tightened. Also associated with the wrench is calculator means for developing a signal representative of a theoretical curve having a predetermined relationship with the Torque-Rotation curve and for feeding the theoretical curve signal to control means where it is processed with one of the other signals developed during the tightening cycle for developing a control signal when the processed signals have a predetermined relationship reprpesentative of the yield point of the fastener system.

For a better understanding of the invention disclosed herein, reference is made to the following description of several preferred embodiments taken in conjunction with the figures of the accompanying drawing, in which.

Figure 1:
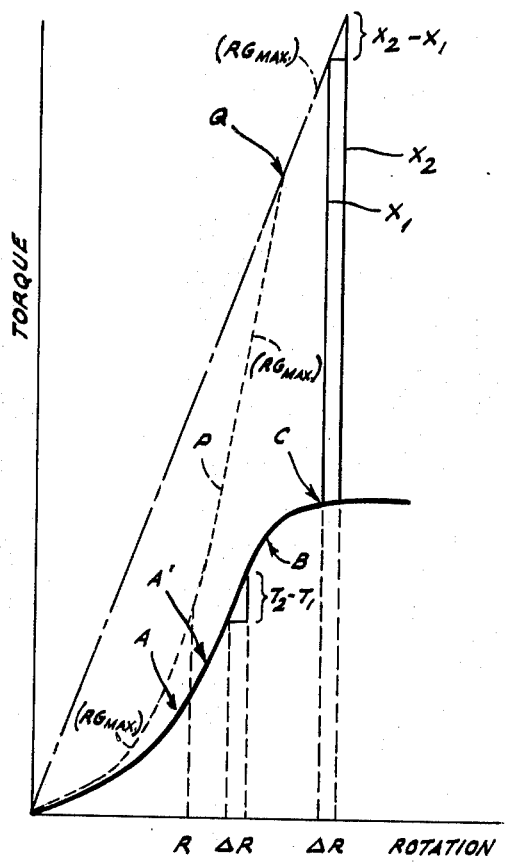
FIGS. 1 and 3 are plots of a curve illustrating the characteristics of a typical torque-rotation relationship experienced by a fastener during a tightening cycle and graphically illustrating an underlying principle of one embodiment of the invention.

Referring to FIG. 1, there is illustrated a typical Torque-Rotation curve for a threaded fastener being tightened, with torque plotted along the vertical axis and angular displacement, or rotation, plotted along the horizontal axis. The curve includes an initial or pretightening region extending from the intersection of the torque and rotation axes to approximately point A. In the pretightening region, mating threads of the fastener assembly have been engaged and one of the fasteners is being rotated, but the bearing face of the rotating fastener has not contacted the adjacent face of the structural member included in the joint. At point A on the curve, the structural members have been pulled together by the fastener assembly and actual tightening of the joint commences. The torque at point A is commonly referred to in the art as the "snug" torque. In the tightening region of the curve, extending from point A to point B, which is indicative of the axial force exerted by the fastener clamping the joint members together, the curve is generally linear. As will be more fully explained hereinafter, a point A' may be selected which lies on the linear portion of the Torque-Rotation curve between point A and point B, and is called a "turn-on" point in the tightening cycle. At point B, the limit of proportionality of the joint assembly has been exceeded and rotation of the fastener member starts increasing at a faster rate than the torque. For purposes of this application, point B will be considered as the start of the yield region, but it should be understood that beyond point B, additional load is still induced in the joint assembly but at a non-linear rate of increase. Point C corresponds to the yield point of the joint assembly, and while the definition of yield point varies slightly, it can be considered to be the point beyond which strain or stretch of the bolt is no longer purely elastic. As will become apparent, a tightening system in accordance with this invention is capable of detecting yield point C on the Torque-Rotation curve or points between point B and point C in the yield region, and responding thereto to generate a control signal. In certain applications points B and C may roughly correspond, but this correspondence would not affect the operation of the tightening system.

While in the preceding paragraph reference has been made to the limit of proportionality and yield point of the joint assembly, it should be noted that because of the usual design criteria, these terms usually apply to characteristics of the fastener assembly and most usually to the male fastener or bolt, since fastener assemblies are not usually as rigid as the structural members forming the joint assembly.

It should be understood that the invention relates to a device that is capable of accurately detecting predetermined deviations from the linear portion of the Torque-Rotation curve or curves of other parameters having similar shapes. It should be further understood that particular joint assemblies could include fastener assemblies constructed to cause the curve being plotted to deviate from linearity at some predetermined load other than the start of the yield region. Such a deviation could be detected by the tool and used to generate a control signal. For this reason, the term yield point, as used hereinafter, should be construed to include the yield point of the material from which the fastener is made, as well as points on a generally flattened portion of a Torque-Rotation curve generated by the configurationn of the fastener at a predetermined clamping load.

Still referring to FIG. 1, there is shown a theoretical curve illustrated as a dotted line P which generally deviates from the actual Torque-Rotation curve but which, above point Q, ultimately becomes parallel to the linear portion of the Torque-Rotation curve, that is, the portion of the curve extending from point A to point B. The theoretical torque values of curve P are obtained by continuously multiplying the total fastener rotation R by the maximum gradient $G_{Max}$ of the Torque-Rotation curve experienced, as will be more fully explained hereinafter. The theoretical curve is shown extending as a straight line below point Q at the same slope as the linear portion of the Torque-Rotation curve through the intersection of the torque and rotation axes for illustrative, graphical purposes only, but it should be understood that this portion of the portion of the theoretical curve is not actually generated by the control circuitry. According to one embodiment of the invention a tightening sytem is provided that, in effect, calculates both the actual Torque-Rotation curve and the theoretical curve and continuously subtracts the actual curv from the theoretical curve to develop a decision making signal representative of successive values $X_1$ and $X_2$ illustrated in FIG. 1. When the difference between successive decision-making signals over a fixed increment of rotation assumes a predetermined relationship relative to the slope of the linear portion of the Torque-Rotation curve from point A to point B, a control signal is generated which can be utilized to stop the tightening of a fastener.

Figure 2:
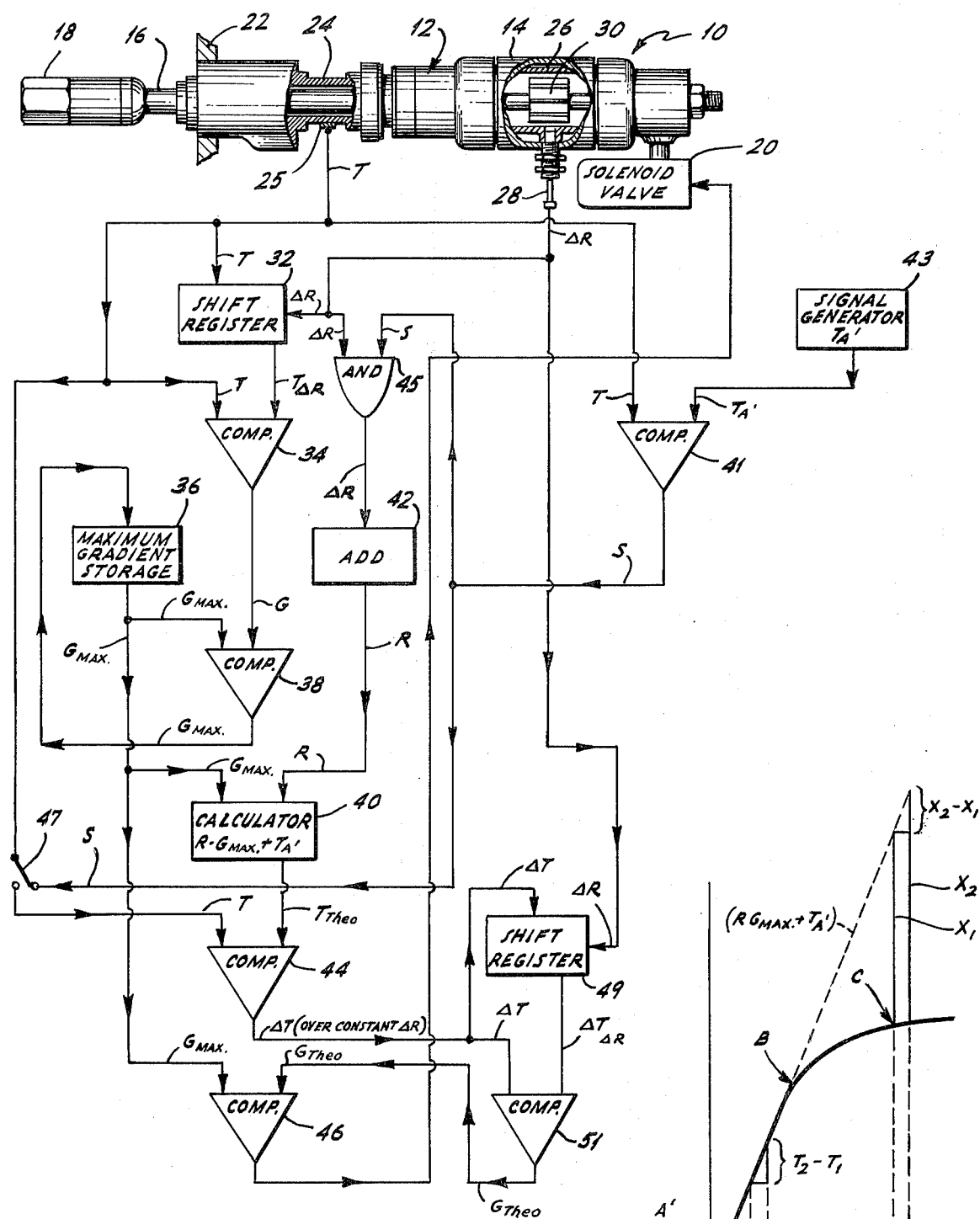
FIG. 2 is a schematic drawing of a tightening system in accordance with the principle illustrated in FIGS. 1 and 3.

Referring now to FIG. 2, there is illustrated a first embodiment of a tightening system 10 in accordance with this invention. Tightening system 10 includes a wrench 12 having a motor 14, an output drive shaft 16 and a driver bit 18. Drive shaft 16 is driven by motor 14 to apply torque and impact rotation to a fastener member engaged by driver bit 18. Wrench 12 can be of any conventional type and as is most common, motor 14 can be air powered with the flow of motive fluid being controlled by a suitable electrically operated solenoid control valve 20. It should be understood that motor 14 could also be electric, hydraulic or any combination of pneumatic, hydraulic or electric. The exact details of the wrench are not necessary for a proper understanding of the invention and, accordingly, a more specific description is not provided.

Mounted between the housing of motor 14 and a rigid frame 22 on which the wrench is carried, is a suitable transducer or torque cell 24 for generating a varying signal representative of the instantaneous torque being applied to the fastener. Torque cell 24 can be any of a variety of conventional devices and in the embodiment disclosed herein comprises a somewhat flexible annular member having strain gauges 25 secured to its outer periphery so that the reaction torque on the wrench is measured and an electrical signal is generated. The reaction torque is, of course, equal to and opposite the torque being applied to the fastener. Mounted on drive shaft 16 for rotation therewith and preferably within motor 14, is a suitable encoder 26 that cooperates with a proximity detector 28 for developing signals representative of the incremental angular displacement or rotation of the fastener. Encoder 26 can be any of a variety of suitable devices and in this embodiment includes a series of teeth 30 formed on its outer periphery. Proximity detector 28 senses the presence of metal and, thus, the passage of the teeth and develops an electrical signal representative of predetermined increments of angular rotation. While examples of torque and rotation measuring devices have been described, it should be understood that any of a variety of readily available devices for accomplishing the noted result can be utilized in accordance with the invention.

A control circuit is operatively associated with wrench 12 for controlling the tightening of the fastener and includes a gradient calculating system that determines the instantaneous gradient or slope of the Torque-Rotation curve, which could be plotted on a graph, if desired, for the particular fastener being tightened, and develops an electrical signal representative thereof. The gradient calculating system comprises a shift register 32 to which the instantaneous torque signal is fed and whose output is clocked by the rotation signal at fixed increments of angular rotation. Accordingly, the output of shift register 32 is a signal representative of torque a predetermined number of degrees of rotation previous to the instantaneous rotation. A comparator 34 in the form of a suitable subtraction circuit receives the output of shift register 32 and also the signal representative of instantaneous torque and provides an output signal representative of the difference. Since torque signals are subtracted over fixed increments of rotation, the output signal from comparator 34 is representative of the instantaneous gradient of the Torque-Rotation curve through which the fastener is being tightened.

At this point, it should be noted that while the Torque-Rotation curve is generally linear from points A to B, this portion of the curve may include temporary spikes which are caused by temporary seizing of the mating threads or by temporary acceleration of rotation caused by lack of or excessive lubricant, respectively, on a particular point on the threads for any particular fastener. Thus, the output of comparator 34, which would be a signal of constant magnitude if the Torque-Rotation curve were exactly linear from point A to point B, may experience certain changes. For this reason the gradient calculating system may include circuits for determining and storing the maximum gradient experienced up to any point along the Torque-Rotation curve, that is, up to any point in the tightening cycle. In effect, the maximum gradient experienced in the linear region of the curve is considered the gradient for that region of the curve. That is, only the maximum gradient is stored and becomes the constant gradient of the ultimate linear portion of the theoretical curve, as will be more fully explained hereinafter. Accordingly, a storage circuit 36 is provided, which circuit stores a signal representative of the maximum gradient so far encountered and a comparator 38 is provided for comparing instantaneous gradient signals with the previously stored maximum signal from storage circuit 36. If an instantaneous gradient signal is larger than a stored gradient signal, the instantaneous gradient signal is then stored in storage circuit 36. For a fuller description of storage circuit 36 and comparator circuit 38, reference is made to co-pending application Ser. No. 507,417, filed Sept. 19, 1974 which is a continuation-in-part of application Ser. No. 357,920, filed May 7, 1973 for Apparatus For and Method Of Determining Rotational or Linear Stiffness by John T. Boys.

Before proceeding with a description of the remaining portions of the control circuit, reference is again made to FIG. 1 wherein it can be seen that the equation for the ultimate linear portion of the theoretical curve can be written as follows:

$$T_{Theo} = RG_{Max}$$

Figure 3:
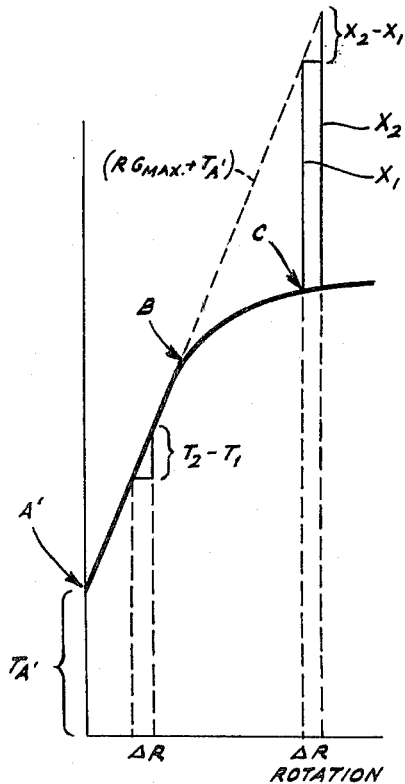

In the above equation, T represents a theoretical torque value, R represents a corresponding total angle of rotation, and $G_{Max}$ represents the gradient of the theoretical curve, which is equal to the maximum gradient of the Torque-Rotation curve in its linear region. By providing a suitable calculator system, a signal can be developed which is representative of the theoretical curve. It should be noted that in order to insure that the control system does not shut off prematurely in the initial or pretightening region prior to snug point A, measurement of torque and rotation may be delayed until point A' on the linear portion of the curve is reached. Expressed in another way, rotation prior to "turn-on" point A may be disregarded until a torque value $T_{A'}$ has been reached. In effect, the torque axis of the torque-rotation curve is shifted so that it extends through point A', as illustrated in FIG. 3 of the drawing. For the curve illustrated in FIG. 3, the following equation can be written:

$$T_{Theo} = RD_{Max} + T_{A'}$$

In the above equation $T_{Theo}$ represents a theoretical torque value, R represents a corresponding total angle of rotation measured from the "turn-on" torque point, $C_{Max}$ represents the gradient or slope of the theoretical curve and $T_{A'}$ represents the "turn-on" torque value. From the graph and the equation it should be clear that by starting to measure angular rotation at point A' and by adding torque value $T_{A'}$, an exact determination of a starting point for measuring rotation is not required. Further it should be noted that the torque value $T_{A'}$ should be selected such that point A' lies on the linear portion of the Torque-Rotation curve, as pointed out hereinbefore.

Calculator 40 is a multiplier and adder circuit which receives the maximum gradient signal $G_{Max}$ so far encountered from storage circuit 36 and a signal R from a totalizer or adding circuit 42, which receives incremental rotation signals from proximity detector 28, adds them, and provides an output signal representative of the total rotation R of the fastener. Calculator 40 multiplies input signals R and $G_{Max}$ and adds a fixed signal $T_A$ representative of the "turn-on" torque value. The output signal from calculator 40 is representative of the instantaneous torque $T_{Theo}$ at any point on the theoretical curve. To shift the torque axis in accordance with FIG. 3, the torque signal from torque cell 24 is fed to a comparator 41 which receives another signal from a preset signal generator 43, which signal is representative of the "turn-on" torque value $T_{A'}$. Between proximity detector 28 and adding circuit 42 is an AND gate 45 which is also connected to the output of comparator 41. Thus, when the actual torque value from torque cell 24 reaches the predetermined "turn-on" torque value $T_{A'}$ from generator 43, comparator 41 provides an output control signal S to AND gate 45, allowing the passage of rotation signals from proximity detector 28 to adding circuit 42. Accordingly, calculator 40 provides no output signal until torque value $T_{A'}$ is reached.

The output signal from calculator 40 is fed to a comparator 44 in the form of a subtraction circuit which also receives an output signal from torque cell 24 representative of the instantaneous torque applied to the fastener. The instantaneous torque signal from torque cell 24 is used to generate the Torque-Rotation curve and when the instantaneous torque is subtracted from the theoretical torque in the linear region, the difference is zero (0), producing no meaningful output. It should be noted hat to prevent any output from comparator 44 until point A' is reached, a switch 47 can be connected between torque cell 24 and one input to comparator 44, switch 47 being closed by control signal S from comparator 41. After the fastener has been tightened into the yield region of the Torque-Rotation curve, that is, beyond point B, comparator 44 outputs a signal representative of the difference between the torque values of the two curves at the same increment of rotation R of the fastener. An example of two such differential signals are illustrated at the approximate yield point of $X_1$ and $X_2$ on FIGS. 1 and 3 of the drawing. It should be clear from the drawing that the torque values of the theoretical and actual curves are subtracted at the same increment of rotation R and thus the output signal from comparator 44 may be considered a decision-making signal.

Referring to FIGS. 1 and 3 of the drawing, it can be seen that in the region from points B to C on the Torque-Rotation curve, the curve progressively flattens, and at yield point C, approaches a straight line parallel to the horizontal rotation axis. It can also be seen that at yield point C, the difference between $X_2$ and $X_1$, over an increment of rotation $\Delta R$, which increment is the same as the increment used to calculate the gradient of the Torque-Rotation curve in the linear region, is approximately equal to the maximum gradient of the Torque-Rotation curve in the linear region. Expressed in slightly different terminology, at the yield point, the difference between successive decision-making signals over a fixed increment of rotation from comparator 44 is approximately equal to the maximum gradient of the Torque-Rotation curve in its linear region, as shown in FIGS. 1 and 3. This approximate equality results because the increments of rotation $\Delta R$ are equal and the theoretical curve is a straight line, so that when the Torque-Rotation curve is approximately parallel to the rotation axis, similar triangles are defined and $(X_2 - X_1)$ equals $(T_2 - T_1)$ measured in the linear region of the curve. While the assumption that at the yield point the actual Torque-Rotation curve parallels the rotation axis is not exact, it is reasonably accurate and may be utilized as the determining relationship for detecting the yield point of the fastener being tightened. It is further noted that an accurate approximation of the yield point can be indicated when the aforementioned difference between successive decision-making signals from comparator 44 is between about 40% to 100% of the maximum gradient in the linear region of the Torque-Rotation curve. Stated another way, when $(X_2 - X_1) = (0.40 \text{ to } 1.00) (T_2 - T_1)$, over a constant $\Delta R$, shut off of the tightening system can be effected. Accordingly, the above relationships can be utilized to shut off wrench 12.

Referring again to FIG. 2, the decision-making signal from comparator 44 is fed to a shift register 49 and a comparator 51. Shift register 49 is a conventional device whose output is clocked by rotation signals from proximity probe 28 and fed to comparator 51. Thus, comparator 51 receives successive decision-making signals from comparator 44 over fixed increments of rotation $\Delta R$ and subtracts them providing an output signal representative of the gradient of the decision-making signal. The output signal from comparator 51, representative of the gradient of successive decision-making signals, is fed to a comparator 46 which also receives the stored maximum gradient signal from storage circuit 36. When the compared signals have a desired relationship indicative of the yield point, as noted above, a control signal is developed by comparator 46 and fed to solenoid valve 20 closing the valve and shutting off tightening system 10.

Figure 4:
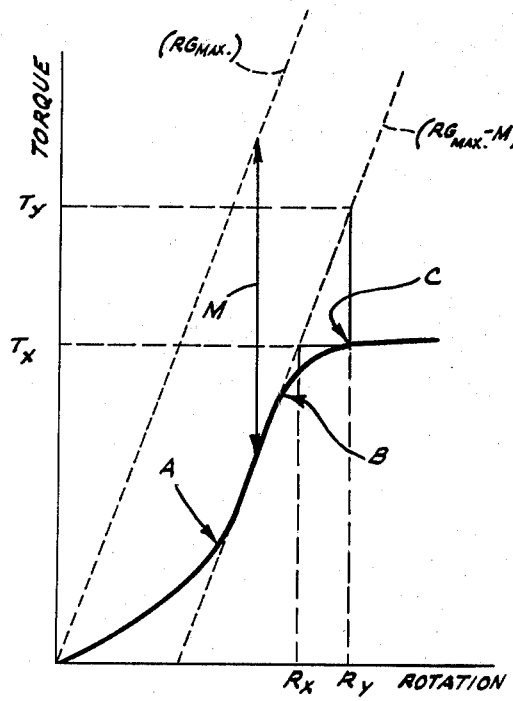
FIG. 4 is a plot of a curve illustrating the characteristics of a typical torque-rotation relationship experienced by a fastener during a tightening cycle and illustrating an underlying principle of another embodiment of the invention.

Referring now to FIG. 4, there is provided a graphic illustration of the underlying principle of another embodiment of a tightening system in accordance with the present invention. The characteristic Torque-Rotation curve is again illustrated similar to FIGS. 1 and 3, and includes an initial pretightening region from the intersection of the torque and rotation axes to snug point A, a generally linear region from point A to point B and a non-linear or yield region from point B, which region includes the yield point C. Also illustrated in FIG. 4 is a theoretical curve similar to the straight line portion of the theoretical curve in FIG. 1 which, as can be seen, is parallel to the generally linear portion of the Torque Rotation curve. As previously described, the equation of this curve can be written as follows:

$$T_{Theo\,(1)} = RG_{Max}$$

where $T_{Theo\,(1)}$ represents a theoretical torque value, R represents a corresponding total angle of rotation and $G_{Max}$ represents the gradient of the theoretical curve, which is equal to the maximum gradient of the Torque-Rotation curve in its linear region. In order to superimpose this theoretical curve on the linear portion of the Torque-Rotation curve, a value M must be subtracted from theoretical torque value, $T_{Theo\,(1)}$. Therefore the equation of the superimposed theoretical curve become:

$$T_{Theo\,(2)} = RG_{Max} - M$$

where M is a constant equal to:

$$M = R_{G_{Max}} \cdot G_{Max} - T_{G_{Max}}$$

where $R_{G_{Max}}$ represents the total rotation at the maximum gradient, and $T_{G_{Max}}$ represents the instantaneous torque value at the maximum gradient.

Figure 5:
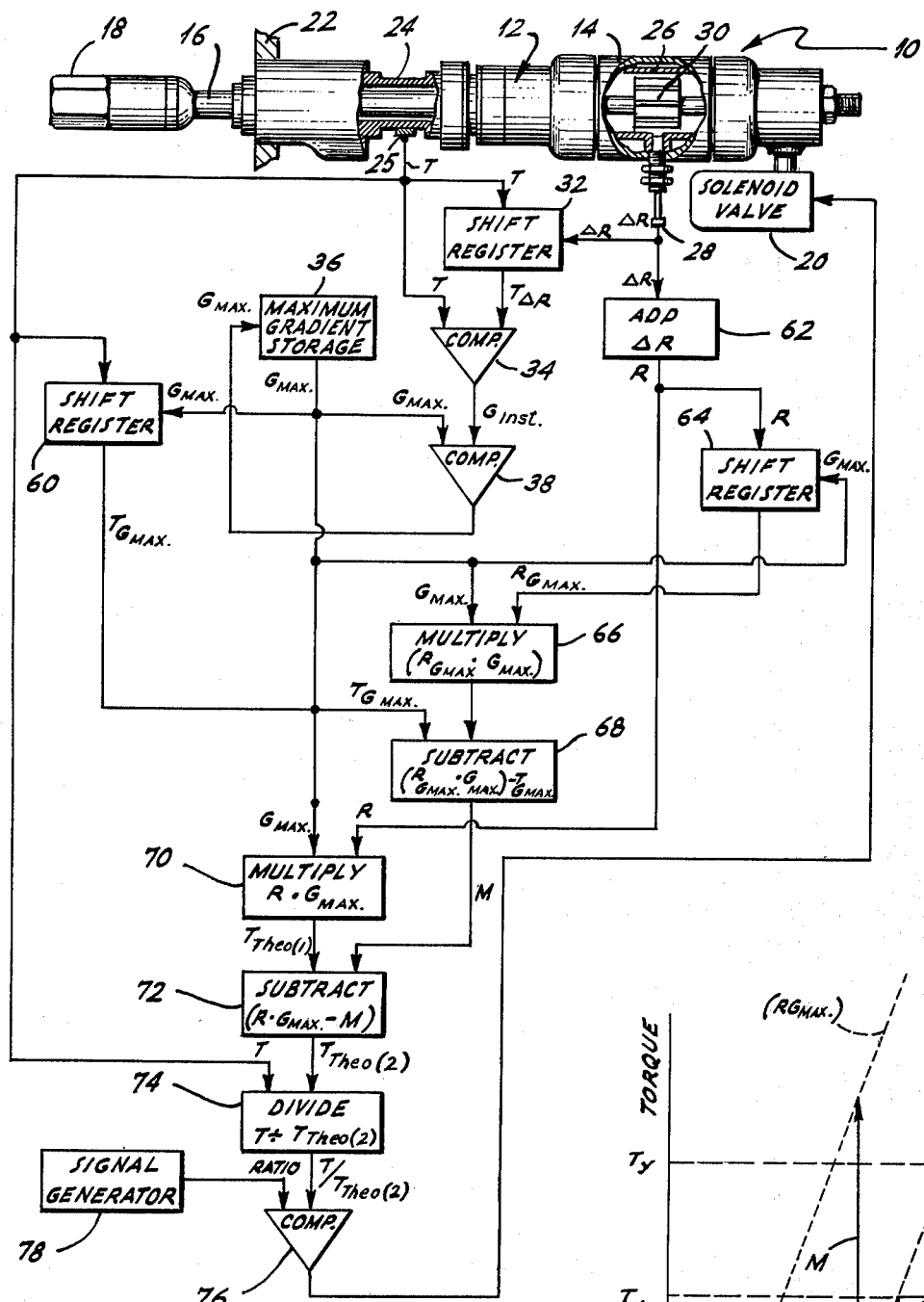
FIG. 5 is a schematic drawing of a tightening system in accordance with the principle illustrated in FIG. 4.

Referring to FIG. 5, a tightening system 50 is shown in accordance with the principle illustrated in FIG. 4. Tightening system 50 includes parts generally similar to certain parts of tightening system 10 illustrated in FIG. 2 and, accordingly, like reference numerals for the similar parts are utilized. Thus, tightening system 50 includes a wrench 12 including a motor 14 having an output shaft 16 and a driver bit 18. Associated with the wrench is a rigid frame member 22 carrying a torque cell 24 which is connected to the housing of motor 14 for developing signals representative of the torque being applied to a fastener. Encoder 26 carried on drive shaft 16 within the housing of motor 14 cooperates with a metal proximity detector 28 for developing signals representative of the incremental angular displacement of the shaft and, accordingly, the fastener.

Also similar to the embodiment illustrated in FIG. 2 a control system is provided and includes a shift register 32 which receives instantaneous torque signals from torque cell 24 and which is clocked by the incremental rotation signals from proximity detector 28. Accordingly, the output of shift register 32 is fed to a comparator 34 in the form of a subtraction circuit which also receives instantaneous torque signals from torque cell 24 to provide an output signal representative of the instantaneous gradient of a Torque-Rotation curve which could be plotted for the particular fastener being tightened. It is also noted that tightening system 50 includes a storage circuit 36 for storing a signal representative of the maximum gradient $G_{Max}$, so far experienced up to any point in the tightening cycle and a comparator 38 for comparing instantaneous gradient signals with the stored maximum gradient signal to determine if a new maximum gradient has been experienced.

In accordance with the present embodiment, instantaneous torque signals from torque cell 24 are fed into a shift register 60 which is clocked by the maximum gradient signal $G_{Max}$ from storage circuit 36. Incremental rotation signals from proximity detector 28 are fed to an adding circuit 62 which provides a total angular rotation signal R to a shift register 64 also clocked by maximum gradient signal $G_{Max}$ from storage circuit 36. The output from shift register 64, representative of total angular rotation at the maximum gradient of the Torque-Rotation curve, is multiplied by the maximum gradient value $G_{Max}$ in multiplier 66, whose output is fed into a subtraction circuit 68 which also receives the output from shift register 60 representative of the instantaneous torque at the maximum gradient of the Torque-Rotation curve. Subtraction circuit 68 outputs the difference, M, between the torque value of the theoretical curve and a curve superimposed on the linear portion of the actual Torque-Rotation curve. The maximum gradient, $G_{Max}$, is fed into a multiplier 70 along with the total rotation signal, R, from adding circuit 62, where the two signals are multiplied. The output from multiplier 70 is fed into a subtraction circuit 72 where the output signal, M, from circuit 68 is subtracted. The output signal from circuit 72 represents the theoretical torque signal of the theoretical curve superimposed on the linear portion of the torque rotation curve shown in FIG. 4.

Control of the tightening system utilizing the superimposed theoretical curve will now be described, first with reference to FIG. 4 and then with reference to another embodiment of the present invention illustrated by FIG. 6. Referring to FIG. 4, when the Torque-Rotation curve begins to deviate from linearity, the superimposed theoretical curve continues in a straight line. It has been found that when the theoretical and actual torque values bear a certain typical predetermined relationship, the yield point has been reached and shutoff at the tightening system can be effected. This typical relationship has been found to be an actual torque value of between approximately 70% to 95% of the theoretical torque value of the superimposed curve. Referring again to FIG. 5, the theoretical torque value, $T_y$, from subtraction circuit 72 is introduced into a divider 74 along with the instantaneous torque value, $T_x$, measured by torque cell 24. The instantaneous torque, $T_x$, is divided by the theoretical torque, $T_y$, and the resultant ratio signal is fed into a comparator 76 which receives a second input from a signal generator 78. Generator 78 is programmed to produce a signal indicative of the predetermined ratio of torque signals for controlling shutoff, such as a signal between approximately 0.70 and 0.95. When the ratio of torque signals from divider 74 is equal to the predetermined signal from generator 78, an output signal is produced by comparator 76 to solenoid value 20 closing the valve to shut off the flow of fluid to tightening system 50.

Figure 6:
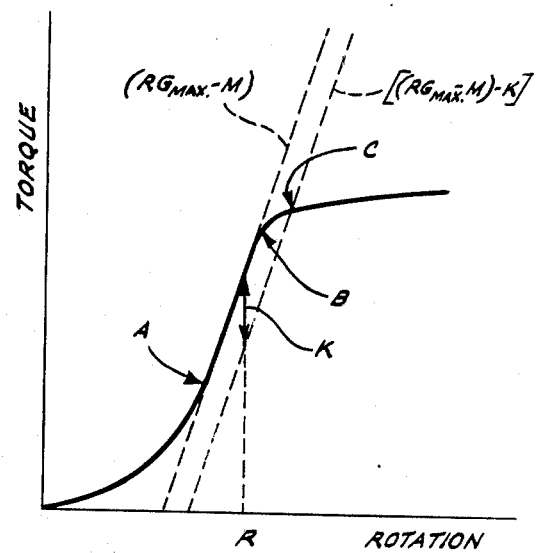
FIG. 6 is a plot of a curve illustrating the characteristics of a typical torque-rotation relationship experienced by a fastener during a tightening cycle and illustrating an underlying principle of still another embodiment of the invention.

Referring now to FIG. 6, there is provided a graphic illustration of the underlying principle of another embodiment of a tightening system in accordance with the present invention. The characteristic Torque-Rotation curve is again illustrated similar to FIGS. 1 and 4 with points A, B and C having the same significance as previously described. A theoretical curve superimposed on the actual Torque-Rotation curve in the linear region is shown and is obtained in a similar manner as described with reference to FIGS. 4 and 5, hereinabove. Also illustrated in FIG. 6 is another theoretical curve in the form of a straight line which is parallel to the linear portion of the Torque-Rotation curve, but which is offset along the rotation axis such that at any point of rotation, R, the instantaneous torque being applied to the fastener is higher than the torque of the theoretical curve by a predetermined constant K. The magnitude of K is predetermined in such a manner that the intersection of the theoretical curve and the Torque-Rotation curve is located at yield point C of the fastener being tightened. As will be recognized, the graphic illustration in FIG. 6 is somewhat analogous to the classic offset yield strength technique for determining the yield point of a material, but varies from that well known technique in that the offset in the present invention is based on a stress or torque offset rather than a strain or rotation offset. It can be seen that at the yield point C of the fastener system, the actual torque equals the theoretical torque on the theoretical curve. Accordingly, this embodiment of the invention compares the actual torque with the theoretical torque and develops the control signal when the compared signals are approximately equal. Referring to FIGS. 4 and 6, it can be seen that an equation for the theoretical curve can be written as follows:

$$T_{Theo\,(3)} = (RG_{Max} - M) - K$$

In the above equation, $T_{Theo\,(3)}$ represents a theoretical torque value, R represents a corresponding angle of rotation, $G_{Max}$ represents the gradient of the theoretical curve which is equal to the maximum gradient of the Torque-Rotation curve in its linear region, and K represents the predetermined constant noted above. For any point on the rotation axis under the linear region of the Torque-rotation curve, the theoretical torque T will be less than the actual instantaneous torque by the constant K. The value of constant K may be empirically determined and is chosen such that the theoretical torque is in a range of about 80% to 98% of the instantaneous torque in the linear region of the Torque-Rotation curve.

Figure 7:
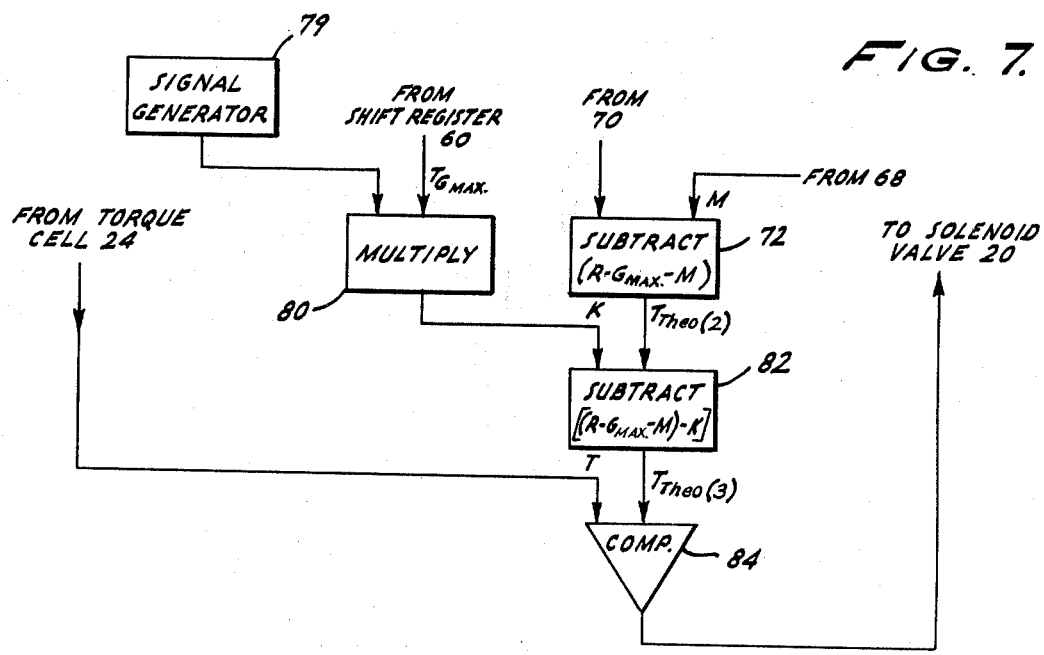
FIG. 7 is a partial schematic drawing referring in part to the system of FIG. 5, in accordance with the principle illustrated in FIG. 6.

Referring now to FIGS. 5 and 7, the signal representative of the theoretical curve which is superimposed on the linear portion of the Torque-Rotation curve is produced by subtraction circuit 72, as described in detail hereinbefore. This output signal along with a signal, K, from a multiplier circuit 80 are fed into a subtraction circuit 82 whose output represents the offset theoretical curve of FIG. 6. Signal K is the previously described constant which is continuously subtracted from the superimposed theoretical torque value. It is obtained by using the signal from shift register 60 of FIG. 5, which is indicative of the instantaneous torque value at the maximum gradient, and multiplying the signal by a predetermined fixed percentage between approximately 2% to 20%, which values are the inverse of the desired theoretical torque values of about 80% to 98%, from signal generator 79. Signal K is subtracted from the superimposed theoretical curve signal in circuit 82, yielding a signal representative of the offset theoretical curve, which is shown parallel along its entire length to the linear portion of the Torque-Rotation curve at the maximum gradient thereof for illustrative, graphical purposes in FIG. 6. The output signal from circuit 82 is fed into a comparator 84 which also receives an instantaneous torque signal from torque cell 24. When these two signals are equal, indicating the intersection of the offset theroetical curve with the actual Torque-Rotation curve in FIG. 6, and thus yield point C, a signal is produced to solenoid valve 20 closing the valve in order to shut off the flow of fluid in the tightening system.

It should be understood, although not specifically described, that control systems operating on similar principles as described in all three embodiments could readily be constructed to utilize a rotation relationship of the theoretical and actual curves in order to effect shutoff of the tightening system. For example, FIG. 4 graphically shows that when the theoretical rotation $R_x$, bears some predetermined relationship to the actual rotation $R_y$ at a fixed torque value $T_x$, shutoff could be similarly effected. This predetermined relationship can typically be between approximately 70% to 95%.

Having thus described several of the preferred embodiments of the present invention, some of the many advantages should now be readily apparent. Each of the tightening systems described provides a relatively simple, economical and reliable system for accurately tightening a fastener to its yield point with minimum previous knowledge of the particular joint being assembled. Each of the tightening systems is further made up of conventional components which are highly reliable and readily available.

While in the foregoing there have been disclosed various embodiments of a tightening system in accordance with the present invention, various changes and modifications should be readily apparent to one skilled in the art and are within the intended scope of the invention as recited in the claims.

What is claimed is:

1. A tightening system for tightening a fastener system until a yield point has been detected, said tightening system comprising:
    wrench means for applying torque and imparting rotation to a fastener;
    measuring means associated with said wrench means for developing a signal representative of the torque being applied to the fastener and for developing a signal representative of the rotation of the fastener;
    gradient calculating means responsive to said torque and rotation signals for developing a gradient signal representative of the slope of a Torque-Rotation curve which could be plotted for the fastener being tightened;
    calculator means for developing a signal representative of a theroetical curve having a predetermined relationship with said Torque-Rotation curve; and
    control means responsive to said theoretical curve signal and one of said other signals for developing and a control signal when theoretical curve signal and one of said other signals have a predetermined relationship representative of the yield point of the fastener system.

2. A tightening system in accordance with claim 1 wherein said Torque-Rotation curve has a linear and non-linear region, and a wherein said calculator means develops a signal representative of a theoretical curve superimposed on the linear region of the Torque-Rotation curve, said theoretical curve remaining linear in the non-linear region of the Torque-Rotation curve.

3. A tigthening system in accordance with claim 2 wherein said torque signal is subtracted with said theoretical curve signal providing a decision-making signal.

4. A tigthening system in accordance with claim 3 wherein the difference between successive decision-making signals over a fixed increment of rotation is compared to the gradient signal and a control signal is developed when said compared signals have a predetermined relationship.

5. A tightening system in accordance with claim 3 wherein said control means includes means for determining the difference between successive ones of said decision-making signals over a fixed increment of rotation and means for comparing said difference to the gradient signal developed in the linear region of said Torque-Rotation curve, said control means developing said control signal when said compared signals have a predetermined relationship.

6. A tightening system in accordance with claim 5 wherein said control signal is developed when said compared signals are approximately equal.

7. A tightening system in accordance with claim 5 wherein said control signal is developed when said difference between successive ones of said decision-making signals over a fixed increment of rotation is at least about 40% but less than 100% of said gradient signal.

8. A tightening system in accordance with claim 1 wherein said Torque-Rotation curve has a linear and a non-linear region, and wherein said calculator means develops a signal representative of a theoretical curve parallel to and offset from the linear region of said Torque-Rotation curve, said theoretical curve remaining linear in the non-linear region of said Torque-Rotation curve.

9. A tightening system in accordance with claim 8 wherein said theoretical curve signal is compared to said torque signal and wherein said control signal is developed when said compared signals have a predetermined relationship.

10. A tightening system in accordance with claim 9 wherein said control signal is developed when said compared signals are approximately equal.

11. A tightening system in accordance with claim 8 wherein said theoretical curve is offset from said Torque-Rotation curve by a predetermined constant such that in the linear region of the Torque-Rotation curve, the theoretical torque is between about 80% to 98% of the actual torque.

12. A tightening system in accordance with claim 2 wherein a ratio based upon said actual torque signal and said theoretical curve signal is calculated providing a decision making signal.

13. A tightening system in accordance with claim 12 wherein said decision-making signal is compared to a signal representative of a predetermined relationship between said actual torque signal and said theoretical curve signal, and a control signal is developed when said compared signals are approximately equal.

14. A tightening system in accordance with claim 13 wherein said signal representative of a predetermined relationship is between about 0.70 to 0.95.

15. A tightening system in accordance with claim 2 wherein a ratio based upon said actual rotation signal and said theoretical curve signal is calculated providing a decision-making signal.

16. A tightening system in accordance with claim 15 wherein said decision-making signal is compared to a signal representative of a predetermined relationship between said actual rotation signal and said theoretical curve signal, and a control signal is developed when said compared signals are approximately equal.

17. A tightening system in accordance with claim 16 wherein said signal representative of a predetermined relationship is between about 0.70 to 0.95.

18. A tightening system in accordance with claim 1 wherein said control signal is operative to shut off the wrench.

19. A tightening system in accordance with claim 1 including means for activating said calculator means after a predetermined torque value is applied to the fastener.

20. A tightening system in accordance with claim 1 wherein said Torque-Rotation curve has a linear and a non-linear region, and wherein said calculator means develops a signal representative of a theoretical curve, a portion thereof being parallel to the linear region of the Torque-Rotation curve.

21. A tightening system in accordance with claim 20 wherein said torque signal is subtracted from said theoretical curve signal providing a decision-making signal.

22. A tightening system in accordance with claim 21 wherein the difference between successive ones of said decision-making signals over a fixed increment of rotation is compared to the gradient signal and a control signal is developed when said compared signals have a predetermined relationship.

23. A tightening system in accordance with claim 21 wherein said control means includes means for determining the difference between successive ones of said decision-making signals over a fixed increment of rotation and means for comparing said difference to the gradient signal developed in the linear region of said Torque-Rotation curve, said control means developing said control signal when said compared signals have a predetermined relationship.

24. A tightening system in accordance with claim 23 wherein said control signal is developed when said compared signals are approximately equal.

25. A tightening system in accordance with claim 23 wherein said control signal is developed when said difference between successive ones of said decision-making signals over a fixed increment of rotation is at least about 40% but less than 100% of said gradient signal.

26. A tightening system for tightening a fastener system until a significant point in the tightening cycle has been detected, said tightening system comprising:
a wrench for tightening a fastener;
measuring means associated with said wrench for developing signals representative of two fastener system characteristics related such that a curve plotted for the characteristics includes a generally linear tightening region and a non-linear region;
gradient calculating means responsive to said signals for developing a gradient signal representative of the slope of said curve;
calculator means for developing a signal representative of a theoretical curve having a predetermined relationship with said curve; and
a control signal when said theoretical curve signal and said one of said other signals have a predetermined relationship representative of the significant point in the tightening cycle of the fastener system.

27. A method of tightening a fastener system until a yield point has been detected comprising the steps of:
applying torque and imparting rotation to a fastener;
measuring a signal representative of the torque being applied to the fastener;
measuring a signal representative of the rotation of the fastener;
calculating a gradient signal representative of the slope of a Torque-Rotation curve which could be plotted for the fastener being tightened;
producing a signal representative of a theoretical curve having a predetermined relationship with said Torque-Rotation curve; and
developing a control signal when said theoretical curve signal and one of said other signals have a predetermined relationship representative of the yield point of the fastener system.

28. A method of tightening a fastener system in accordance with claim 27 wherein said Torque-Rotation curve has a linear and a non-linear region, and further comprising the step of developing a signal representative of a theoretical curve superimposed on the linear region of the Torque-Rotation curve, said theoretical curve remaining linear in the non-linear region of the Torque-Rotation curve.

29. A method of tightening a fastener region in accordance with claim 28 wherein said torque signal is subtracted from said theoretical curve signal providing a decision-making signal.

30. A method of tightening a fastener system in accordance with claim 29 wherein the difference between successive decision-making signals over a fixed increment of rotation is compared to the gradient signal and a control signal is developed when said compared signals have a predetermined relationship.

31. A method of tightening a fastener system in accordance with claim 29 further comprising determining the difference between successive ones of said decision-making signals over a fixed increment of rotation and comparing said difference to the gradient signal developed in the linear region of said Torque-Rotation curve, and developing said control signal when said compared signals have a predetermined relationship.

32. A method of tightening a fastener system in accordance with claim 31 wherein said control signal is developed when said compared signals are approximately equal.

33. A method of tightening a fastener system in accordance with claim 31 wherein said control signal is developed when said difference between successive ones of said decision-making signals over a fixed increment of rotation is at least about 40% but less than 100% of said gradient signal.

34. A method of tightening a fastener system in accordance with claim 27 wherein said Torque-Rotation curve has a linear and a non-linear region, and further comprising developing a signal representative of a theoretical curve parallel to and offset from the linear region of said Torque-Rotation curve, said theoretical curve remaining linear in the non-linear region of said Torque-Rotation curve.

35. A method of tightening a fastener system in accordance with claim 34 wherein said theoretical curve signal is compared to said torque signal and wherein said control signal is developed when said compared signals have a predetermined relationship.

36. A method of tightening a fastener system in accordance with claim 35 wherein said control signal is developed when said compared signals are approximately equal.

37. A method of tightening a fastener system in accordance with claim 34 wherein said theoretical curve is offset from said Torque-Rotation curve by a predetermined constant such that in the linear region of the Torque-Rotation curve, the theoretical torque is between about 80% to 98% of the actual torque.

38. A method of tightening a fastener system in accordance with claim 28 wherein a ratio based upon said actual torque signal and said theoretical curve signal is calculated providing a decision-making signal.

39. A method of tightening a fastener system in accordance with claim 38 wherein said decision-making signal is compared to a signal representative of a predetermined relationship between said actual torque signal and said theoretical curve signal, and a control signal is developed when said compared signals are approximately equal.

40. A method of tightening a fastener system in accordance with claim 39 wherein said signal representative of a predetermined relationship is between about 0.70 to 0.95.

41. A method of tightening a fastener system in accordance with claim 28 whereinn a ratio based upon said actual rotation signal and said theoretical curve signal is calculated providing a decision-making signal.

42. A method of tightening a fastener system in accordance with claim 41 wherein said decision-making signal is compared to a signal representative of a predetermined relationship between said actual rotation signal and said theoretical curve signal, and a contorl signal is developed when said compared signals are approximately equal.

43. A method of tightening a fastener system in accordance with claim 42 wherein said signal representative of a predetermined relationship is between about 0.70 to 0.95.

44. A method of tightening a fastener system in accordance with claim 27 wherein said Torque-Rotation curve has a linear and a non-linear region, and further comprising the step of developing a signal representative of a theoretical curve, a portion thereof being parallel to the linear region of the Torque-Rotation curve.

45. A method of tightening a fastener system in accordance with claim 44 wherein said torque signal is subtracted from said theoretical curve signal providing a decision-making signal.

46. A method of tightening a fastener system in accordance with claim 45 wherein the difference between successive ones of said decision-making signals over a fixed increment of rotation is compared to the gradient signal and a control signal is developed when said compared signals have a predetermined relationship.

47. A method of tightening a fastener system in accordance with claim 45 further comprising determining the difference between successive ones of said decision-making signals over a fixed increment of rotation and comparing said difference to the gradient signal developed in the linear region of said Torque-Rotation curve, and developing said control signal when said compared signals have a predetermined relationship.

48. A method of tightening a fastener system in accordance with claim 47 wherein said control signal is developed when said compared signals are approximately equal.

49. A method of tightening a fastener system in accordance with claim 47 wherein said control signal is developed when said difference between successive ones of said decision-making signals over a fixed increment of rotation is at least about 40% but less than 100% of said gradient signal.

50. A method of tightening a fastener system in accordance with claim 27 wherein said control signal is operative to shut off the wrench.

51. A method of tightening a fastener system in accordance with claim 27 further comprising calculating said gradient signal after a predetermined torque value is applied to the fastener.

* * * * *